No. 867,327. PATENTED OCT. 1, 1907.
F. D. WEST.
WEIGHING SCALE FOR REFRIGERATORS.
APPLICATION FILED JAN. 2, 1907.
2 SHEETS—SHEET 1.
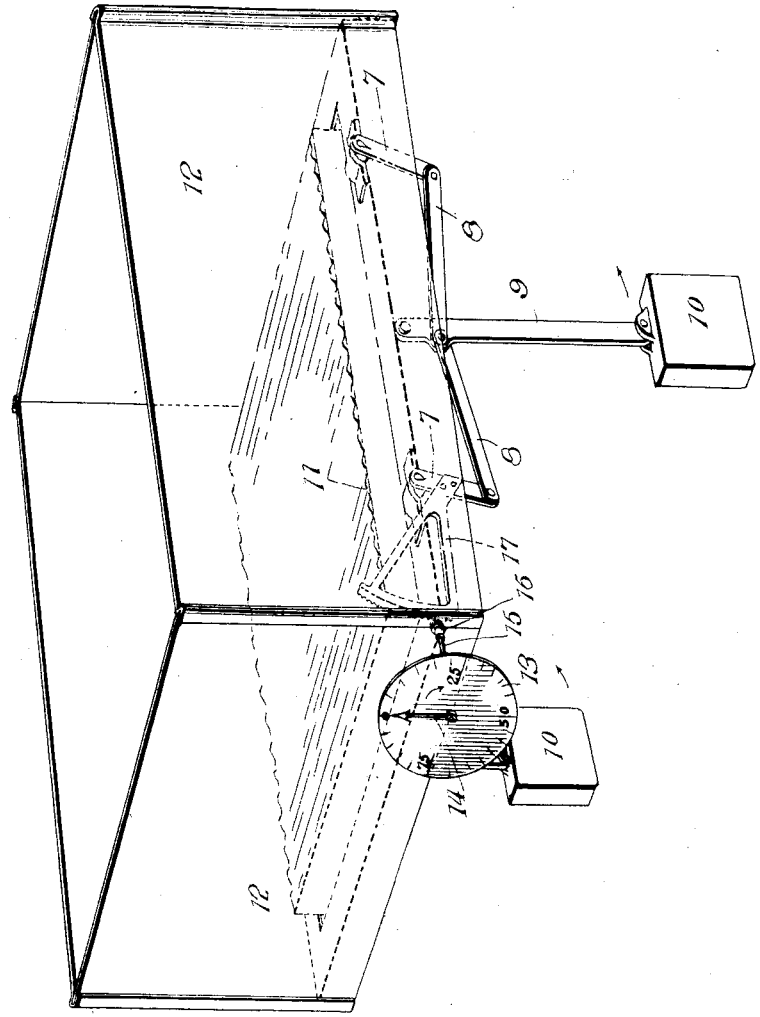
Witnesses
Inventor
Fred D. West,
By R.A.P.Lacey,
Attorneys

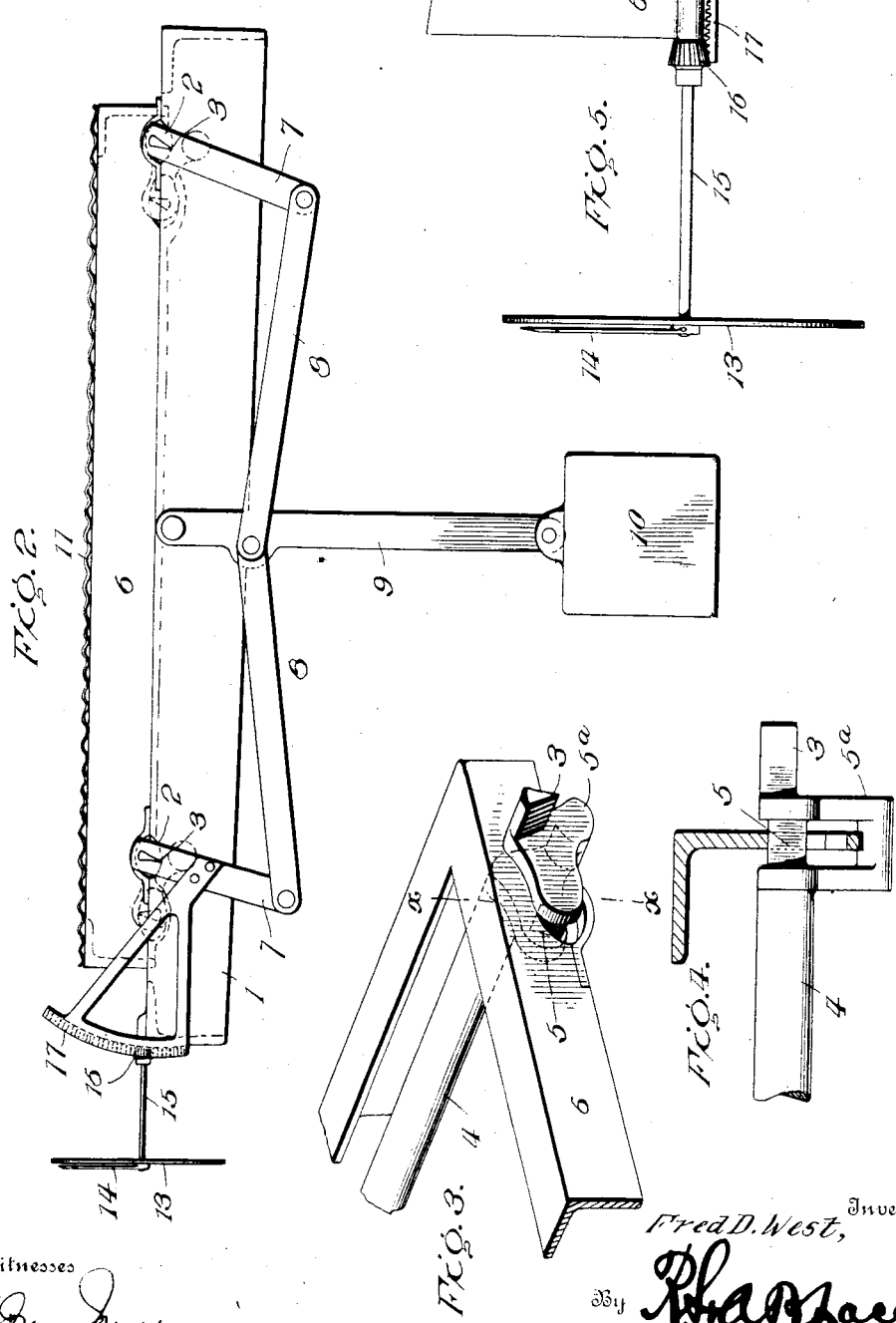

UNITED STATES PATENT OFFICE.

FRED D. WEST, OF CHICAGO, ILLINOIS.

WEIGHING-SCALE FOR REFRIGERATORS.

No. 867,327.      Specification of Letters Patent.      Patented Oct. 1, 1907.

Application filed January 2, 1907. Serial No. 350,411.

*To all whom it may concern:*

Be it known that I, FRED D. WEST, a citizen of the United States, residing at Chicago, in the county of Cook and State of Illinois, have invented certain new and useful Improvements in Weighing-Scales for Refrigerators, of which the following is a specification.

The present invention combines with a refrigerator means whereby the amount of ice may be determined at all times and is of especial advantage when purchasing a supply, since it enables the purchaser to ascertain the exact amount delivered by the merchant. Moreover, the amount of ice on hand may be learned at any time without necessitating the opening of the refrigerator and the examination of the ice chamber.
The purpose of the invention is to devise a simple, effective and novel weighing mechanism which may be adapted to the various makes of refrigerators and which when in position will form a support for the ice or ice chamber and not occupy such an amount of space as to necessitate enlarging the dimensions of the refrigerator in order to obtain ample storage space commensurate with the exterior proportions of the refrigerator.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a weighing mechanism for refrigerators embodying the invention. Fig. 2 is a side view of the weighing mechanism. Fig. 3 is a detail perspective view of a corner portion of the frame of the platform, showing an end portion of a rock shaft. Fig. 4 is a detail view of an end portion of one of the shafts, showing the manner of mounting the platform frame thereon. Fig. 5 is a detail view of the registering mechanism.

Corresponding and like parts are referred to in the following description and indicated in all the views of the drawings by the same reference characters.

Within the refrigerator and preferably near the upper portion thereof, is located the weighing mechanism and the ice chamber. It is to be understood that the weighing mechanism may be suitably positioned according to the make and design of the refrigerator.

The weighing mechanism comprises a frame 1 which constitutes a rest, the same being preferably of rectangular form and of pressed metal, such as galvanized iron or steel. The frame or rest 1 is suitably supported within the refrigerator and is provided at opposite points with bearings 2 which receive pivot bearings 3 of parallel shafts 4. The shafts 4 have crank portions 5 which are provided with knife edge bearings 5 to support a frame 6 of the platform upon which the ice is placed. The pivot bearings 3 project beyond the respective bars of the frame 1 having the bearings 2 and their projecting ends receive arms 7, which are fast thereto, said arms having their ends connected by links 8 to swing bars 9 which are pivoted to the frame 1 or supported in any manner so as to oscillate freely. The swing bars are weighted, as shown at 10, and as the shafts 4 turn from a given position, the swing bars 9 move from the perpendicular and elevate the weights, the deviation of the swing bars from the perpendicular determining the effective leverage acted upon by the weights 10, whereby through suitable registering mechanism the force exerted represented by the weight of the ice may be ascertained.

The frame 6 is composed of angle bars either of galvanized iron or steel, opposite side bars having their vertical wings apertured or otherwise constructed to rest upon the knife edge bearings of the crank portions 5. A plate 11 of corrugated sheet metal is supported by means of the frame 6 and constitutes the platform upon which the ice is placed. Side pieces 12 rise from the platform so as to inclose the ice and form a chamber and warm air ducts, whereby a circulation of air may be established and maintained within the refrigerator when the latter is in service. Opposite side pieces corresponding to the front and rear of the ice chamber are removable, thereby providing for cleaning of the weighing mechanism and the ice chamber when desired.

The registering mechanism consists of a dial 13 having suitable graduations and a hand 14, the latter being attached to a shaft 15 which passes through the dial and is mounted in suitable bearings. A pinion 16 fast to the shaft 15 meshes with a toothed bar 17 which is secured to one of the arms 7 so as to move therewith. When the parts are in normal condition, the swing bars 9 hang vertically and the hand 14 points to zero on the dial 13. Upon loading the platform by placing ice thereon, it is depressed, thereby causing the shafts 4 to rock and the arms 7 to move, and this movement through the links 8 is transmitted to the swing bars 9 and through the gearing 16 and 17 to the registering mechanism, thereby admitting of the weight being readily ascertained.

It is preferred to have the shafts 4 extensible, thereby admitting of readily adapting the weighing mechanism to refrigerators of different sizes and make, it being understood that opposite side bars of the main frame or rest 1 are to be of a size according to the distance between opposite sides of the refrigerator to which the weighing mechanism is to be applied.

Having thus described the invention, what is claimed as new is:

1. The combination with a refrigerator, of a platform adapted to support the ice, shafts having crank portions supporting said platform, arms projected from and movable with said shafts, a frame-work within which said platform is mounted, a weighted swing bar pivotally suspended from said frame, links connecting said arms with said swing bar and registering mechanism operatively connected to said arms and adapted to be actuated by the latter.

2. In combination, parallel shafts having pivot bearings and provided with crank portions, a platform supported upon said crank portions, arms projected from said shafts, a weighted swing bar, links connecting said arms with said swing bar, a registering mechanism embodying a shaft, a pinion fast to the last mentioned shaft, and a toothed bar in mesh with said pinion and attached to one of the aforementioned arms to move therewith.

3. In combination, a main frame, shafts mounted in said frame and provided with crank portions, a platform mounted upon the crank portions of the shafts, arms fast to the shafts, weighted swing bars, links connecting said arms with said weighted swing bars, a registering mechanism embodying a shaft, a pinion fast to said shaft, and a toothed bar in mesh with the pinion and attached to one of the aforementioned arms to swing therewith.

4. In combination, a main frame provided with oppositely disposed bearings, shafts mounted in said bearings and extending across the frame, arms connected to said shafts, said shafts being cranked, a platform mounted within the frame, and upon the cranks of said shafts, links connected at one end to the said arms, weighted swing bars pivotally suspended from said frame and pivotally connected to the other end of said links, and a registering mechanism embodying a shaft mounted in said frame, a pinion fastened to said shaft, and a toothed bar in mesh with the pinion and attached to one of said arms.

In testimony whereof I affix my signature in presence of two witnesses.

FRED D. WEST. [L. S.]

Witnesses:
ARTHUR L. GETTY,
ROBERT L. KIMBRO.